United States Patent [19]

Heiniger et al.

[11] 4,283,863
[45] * Aug. 18, 1981

[54] RANGE FINDER FOR FOCUSABLE PHOTOGRAPHIC OR CINEMATOGRAPHIC CAMERA

[75] Inventors: Wilfred Heiniger; Claude Kreienbühl; Manuel Millan, all of Yverdon, Switzerland

[73] Assignee: Bolex International SA, Ste. Croix, Switzerland

[*] Notice: The portion of the term of this patent subsequent to Jul. 10, 1996, has been disclaimed.

[21] Appl. No.: 10,722

[22] Filed: Feb. 8, 1979

Related U.S. Application Data

[63] Continuation-in-part of Ser. No. 838,377, Sep. 30, 1977, Pat. No. 4,160,587, which is a continuation-in-part of Ser. No. 789,250, Apr. 20, 1977, abandoned, and Ser. No. 787,497, Apr. 14, 1977, abandoned.

[30] Foreign Application Priority Data

| Apr. 15, 1976 [CH] | Switzerland | 004753/76 |
| Apr. 21, 1976 [CH] | Switzerland | 004961/76 |
| Oct. 1, 1976 [CH] | Switzerland | 012428/76 |

[51] Int. Cl.³ .................................... G03B 3/10
[52] U.S. Cl. .................................... 354/25; 352/140; 354/31
[58] Field of Search ............ 354/25, 31; 355/56; 352/140

[56] References Cited

U.S. PATENT DOCUMENTS

| 4,019,049 | 4/1977 | Schulz | 354/25 X |
| 4,085,320 | 4/1978 | Wilwerding | 354/25 X |
| 4,097,881 | 6/1978 | Katagiri | 352/140 X |
| 4,160,587 | 7/1979 | Heiniger et al. | 354/25 |

Primary Examiner—Michael L. Gellner
Attorney, Agent, or Firm—Montague & Ross

[57] ABSTRACT

A camera with a focusable objective including an axially shiftable lens member has two ancillary projection systems continuously or intermittently intercepting incident light rays downstream of that lens member and deflecting them onto respective inputs of a photoelectric comparator which emits a coincidence signal whenever these light rays project substantially identical images of an object to be photographed or filmed. One of the projection systems may include a periodically movable element which varies the relative orientation of the two beams constituted by the deflected light rays so that different angles of incidence give rise to a coincidence signal in different parts of a sweep cycle; in one position of this element, in which the incident rays will have a predetermined orientation (e.g. parallel to the objective axis) with proper focusing, a position sensor generates a correlation signal. A phase detector receiving the coincidence and correlation signals may control a drive motor for the shiftable lens member or may simply indicate to the user the required adjustment. The movable element may be a swingable mirror in the path of a deflector beam or, in the case of a cine camera, a peripheral zone of a rotary shutter reflecting the incident rays between exposures. In the absence of such a movable element, the coincidence signal will appear only when the incident light rays originate at an object point lying substantially in a plane conjugate to the film or other receiving surface.

10 Claims, 4 Drawing Figures

RANGE FINDER FOR FOCUSABLE PHOTOGRAPHIC OR CINEMATOGRAPHIC CAMERA

CROSS REFERENCE TO RELATED APPLICATIONS

This is a continuation-in-part of our copending application Ser. No. 838,377, now U.S. Pat. No. 4,160,587, filed Sept. 30, 1977 as a continuation-in-part of our prior applications Ser. Nos. 787,497, filed Apr. 14, 1977, and 789,250, filed Apr. 20, 1977, both now abandoned.

FIELD OF THE INVENTION

Our present invention relates to a photographic or cinematographic camera with a focusable objective in which an automatic range finder determines the correct focusing position.

BACKGROUND OF THE INVENTION

In U.S. Pat. No. 3,435,744 there has been described an automatic focusing system in which the distance of an object from the camera is determined by training a beam of light upon such object and receiving reflections of that beam on a photocell which is laterally offset from the location of the beam source, the photocell being part of an ancillary optical system which is angularly oscillatable in a scanning sweep to let its own axis intersect the beam axis at different distances from the camera objective. The optical system is mechanically linked with a device for focusing the camera objective by axially displacing one of its lens members.

U.S. Pat. No. 3,838,275 describes a photoelectric comparator designed to determine a coincidence between two projected images produced by respective branches of a range finder, the comparator comprising two arrays of photocells each illuminated by discrete image portions. When the two cell arrays have identical outputs, the projected images are presumed to register with each other. A similar system is described in U.S. Pat. No. 3,844,658.

OBJECTS OF THE INVENTION

The general object of our present invention is the same as that stated in our prior application Ser. No. 838,377, namely to provide means enabling the correct focusing of a camera objective without the need for a mechanical linkage between an optical range finder and an axially shiftable lens member.

A more particular object is to provide means for improving the performance and simplifying the operation of a type of range finder disclosed in parent and grandparent applications Ser. Nos. 838,377 and 787,497 referred to above.

SUMMARY OF THE INVENTION

In accordance with our present invention, and as already disclosed in our two last-mentioned prior applications, a camera with a focusable objective including an axially shiftable lens member is provided with a pair of ancillary projection systems comprising light-guiding means disposed in part within the objective between that shiftable lens member and a film or other receiving surface for intercepting incident light rays from an object to be photographed or filmed and for directing these intercepted light rays in the form of a pair of beams over two separate paths away from the objective axis onto a photoelectric comparator.

When the objective is properly focused, with the aid of manual or automatic setting means acting upon the shiftable lens member, the light rays originating at a common object point on the objective axis will have a predetermined orientation at their points of interception (e.g. parallel to the axis) which in the absence of such interception would make them converge upon the receiving surface to form an image of that object point. Whenever these two beams produce registering images on the comparator, the latter emits a coincidence signal.

In a particular embodiment likewise described in our aforementioned parent and grandparent applications, a movable element in the form of an oscillating mirror is inserted in one of the beam paths whereby a coincidence signal will also be generated if the objective is not correctly focused, i.e. if the intercepted light rays originate at an object point which does not lie in a plane conjugate with the receiving surface. In that case, however, the incident light rays will not have the requisite orientation characterizing proper focusing so that the coincidence signal will appear at an instant at which the position of the movable element is not correlated with that of the axially shiftable lens member serving for focusing purposes. Thus, a correlation signal emitted at a predetermined instant in the oscillatory sweep cycle of the movable element will either lead or lag the coincidence signal when the camera is out of focus, the relative time position of the two signals being ascertainable by a phase detector to indicate the direction in which the shiftable lens member must be adjusted by its focusing means.

The oscillating mirror serving as the periodically movable element in conformity with the disclosure of our parent and grandparent applications is illuminated by one of two stationary semitransparencies on opposite sides of the objective axis, e.g. internal semireflecting surfaces of a prism centered on that axis. If the objective forms part of a cine camera provided with a rotary shutter which obstructs an image gate between exposures, i.e. during advances of an intermittently moving film, the interception of incident light rays to be reflected toward the comparator is advantageously carried out—pursuant to a more particular feature of our present invention—by a reflecting peripheral portion of that shutter. Thus, the incident light rays are only intermittently deflected away from the optical axis, with no weakening of the luminous field during exposure as would be the case with stationary semitransparent reflectors. The reflecting shutter surface is axially split for this purpose into two adjacent ring-segmental zones whose relative inclination in a plane including the shutter axis varies progressively over the shutter periphery, each of these zones lying in a respective beam path; one zone may be of frustoconical shape so that the corresponding beam retains its orientation throughout the cycle of shutter rotation while the other beam is subjected to a periodic rocking or nutation. If desired, however, the two beams may be made to nutate in opposite directions.

As further disclosed in our parent application Ser. No. 838,377, however, such nutation is not indispensable as long as the camera includes means for displacing the focusing lens member over its range of axial shiftability while keeping the objective trained upon the object to be photographed. In that case there will be no correlation signal, yet the coincidence signal will occur precisely at the instant when the shiftable lens member is in the correct focusing position. In this instance, too, the incident light rays may be intercepted continuously by stationary semitransparencies or intermittently by a rotary shutter.

BRIEF DESCRIPTION OF THE DRAWING

The above and other features of our present invention will now be described in detail with reference to the accompanying drawing in which.

SPECIFIC DESCRIPTION

Figure 1:
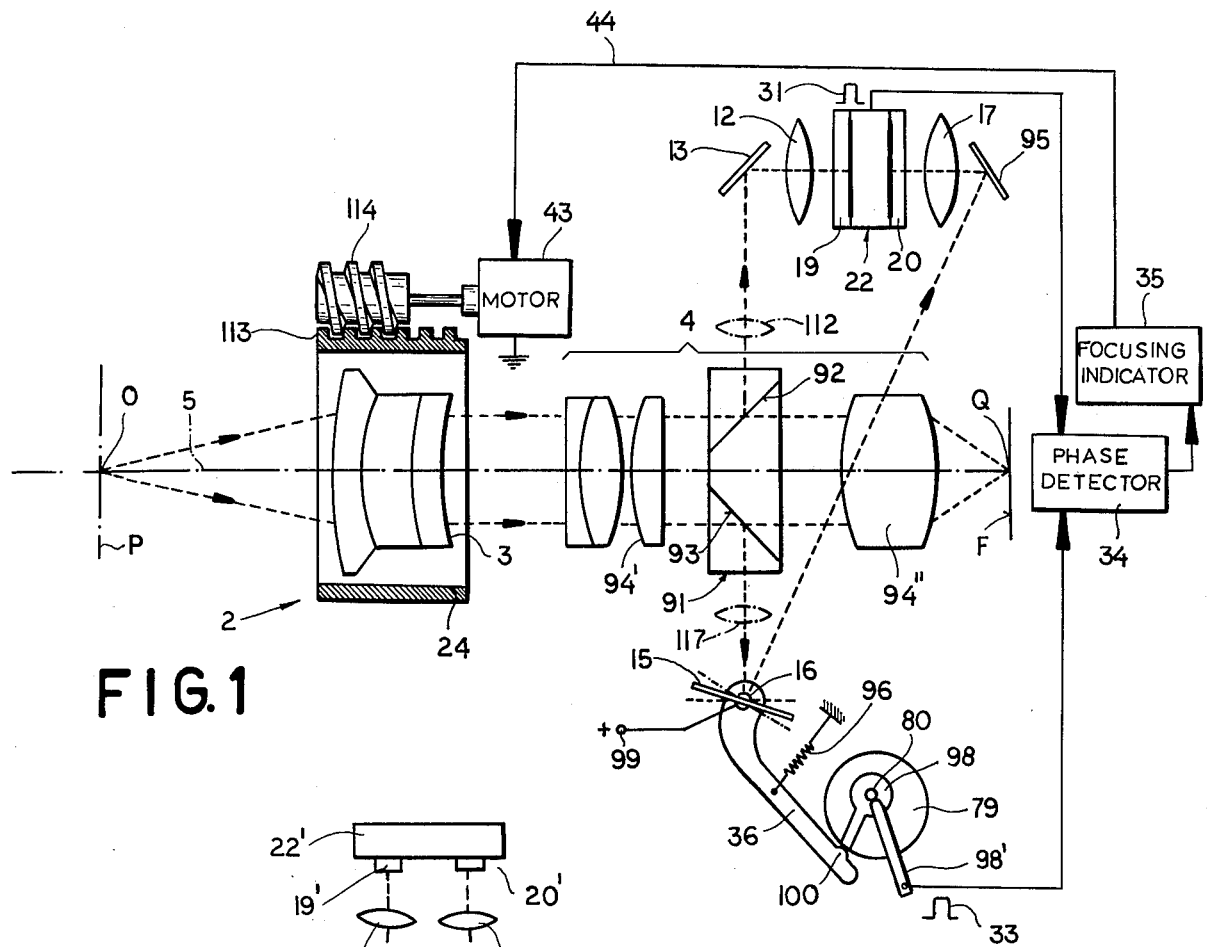
FIG. 1 is a schematic view of the principal components of a camera embodying our invention.

In FIG. 1 we have shown the internal structure of a motion-picture camera comprising an objective 2 which includes several components centered on an optical axis 5, i.e. an axially shiftable lens member 3 and a fixed lens group 4 disposed between lens member 3 and a receiving surface formed by a film F. Two components of lens group 4 have been designated 94' and 94". Front component 3, shown to be of positive refractivity, is mounted in a lens barrel 24 having a rack 113 engaged by a worm 114 which can be reciprocated by a motor 43 under manual control, e.g. with the aid of a nonillustrated pushbutton-operated switch.

In a given position of front component 3, an object plane P is conjugate with the image plane of film F so that a point O at the intersection of plane P with axis 5 is imaged on the film plane F at a point Q lying on that axis. The incident light rays originating at point O, accordingly, pass through the objective 2 in such a way as to converge on point Q after traversing the final component 94". In the instance here illustrated, point Q is the rear focus of component 94" so that these incident light rays are parallel to axis 5 in the space between components 94' and 94". Light rays originating at any other axial point, spaced from the conjugate object plane P, either diverge or converge within that space.

A prism 91 interposed between components 94' and 94" has two internal semireflecting surfaces 92 and 93 inclined to the axis at angles of ±45°. These surfaces intercept part of the incident light rays and reflect them in radially opposite directions toward a pair of mirrors 13 and 15 forming part of two ancillary projection systems. Mirror 13, which is stationary, directs the light rays incident upon surface 92 via a lens 12 onto an input 19 of a photoelectric comparator 22; mirror 15, which is oscillatable about a pivot pin 16, trains the ray bundle reflected by surface 93 via another, fixed reflector 95 and a lens 17 onto a second comparator input 20.

The fixed mirrors 13 and 95 are so oriented that a coincidence pulse 31 will be emitted by comparator 22 only when the light rays intercepted by semireflectors 92 and 93 are parallel to the optical axis 5 and when the mirror 15 is in its central sweep position indicated in full lines.

Mirror 15 is shown carried by an arm 36, fulcrumed on pivot pin 16, which has a lug 100 riding a cam 79 against whose surface the lever is urged by a spring 96. Cam 79 is secured to a shaft 80, driven by a motor not shown, so as to oscillate the arm 36 and the mirror 15; a multiplicity of such oscillatable cycles occur during a single traverse of lens member 3 under the control of motor 43. Cam disk 79 is made of dielectric material and carries a conductor strip 97 integral with a sleeve ring 98 which is contacted by a brush 98' connected to a phase detector 34. Arm 36, which is metallic, is energized from a supply terminal 99 so that a correlation pulse 33 is generated whenever the strip 97 sweeps past the lug 100.

The two pulses 31 and 33 are transmitted to a phase detector 34 which determines their relative time position and signals that position to a focusing indicator 35. The latter may be a simple display device visually informing the user that the objective is in focus or that the motor 43 should be operated in a forward or a reverse direction for a proper positioning of front member 3. Motor 43, however, could also be directly controlled by the focusing indicator 35 via an electrical connection 44.

The parallel orientation of the incident light rays from point O in the region of prism 91, while convenient, is not absolutely essential. Thus, these rays could also be convergent or divergent, yet in that case it would be desirable to insert ancillary lenses 112 and 117 (as indicated in dot-dash lines) between the semireflecting surfaces 92, 93 and the mirrors 13, 15 to focus the two deviated beams upon infinity in order to prevent unequal magnification, due to the difference in path lengths, of the images projected upon comparator inputs 19 and 20.

Figure 2:
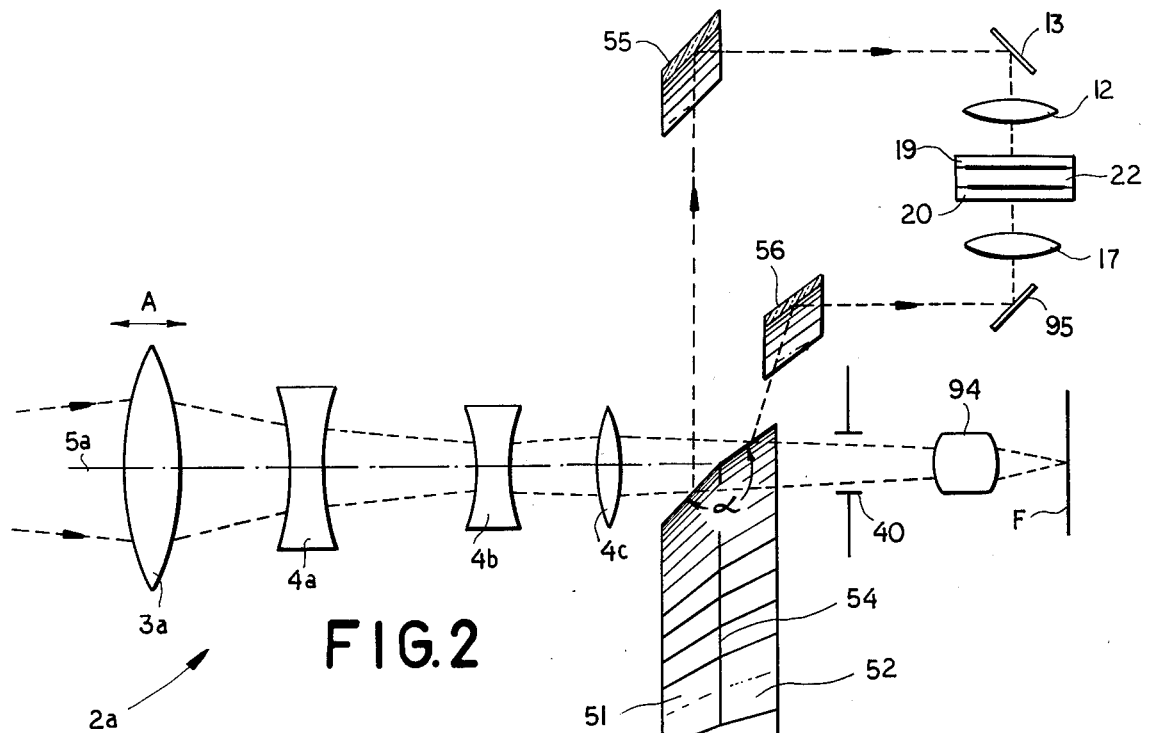

In FIG. 2 we have shown part of a cine camera with an objective 2a comprising a front component 3a, axially shiftable by means such as the motor 43 of FIG. 1 as indicated by an arrow A, and further components 4a, 4b, 4c as well as a final component 94. Incident light rays from a point on an object plane conjugate with the plane of film F converge between components 4c and 94 in a space encompassing a diaphragm 40. A rotary shutter 50 has two peripheral light-reflecting zones 51, 52 extending over part of a circle, e.g. an arc of about 180°, which in the illustrated shutter position object into the diaphragm space to block the passage of incident light rays toward the film F; shutter 50 is carried on a shaft 53 which is rotated in step with the intermittent advance of the film by a nonillustrated mechanism as is well known per se, e.g. from U.S. Pat. No. 4,003,646. The ring-segmental zone 51 is frustoconical, with a vertex lying on the axis of shutter shaft 53; zone 52 has generatrices which, in different planes passing through the axis of shaft 53, include with corresponding generatrices of zone 51 an angle α that varies progressively over the entire sectoral periphery. The two zones adjoin each other along a boundary line 54 intersecting the axis 5a of objective 2a so as to intercept the incident rays on opposite sides of that optical axis. The rays intercepted by zone 51 are deflected toward a concave mirror 55 and do not change their position during rotation of shutter 50. The rays intercepted by zone 52, on the other hand, are deflected with progressively changing angles toward another concave mirror 56 so as to undergo a periodic nutation when the shutter rotates about its axis as indicated by an arrow B. Thus, the relative orientation of the deflected beams varies in an iterative manner, albeit only in one sense in contrast to the reciprocating change produced by the oscillatory mirror 15 of FIG. 1. A wiper 57 entrained by shaft 53 rotates in step therewith, as indicated by an arrow B', to engage a bank contact 58 so as to generate a correlation signal whenever the shutter passes through a position in which the light rays incident upon its surface zones 51 and 52 have the requisite orientation characterizing correct focusing.

Mirrors 55 and 56 compensate for the dispersion imparted to the incident rays by the arcuate reflecting surfaces 51 and 52, respectively. The resulting beams are again directed onto a pair of stationary reflectors 13, 95 which train them, via ancillary lenses 12 and 17, upon the inputs 19 and 20 of comparator 22. The coincidence signal emitted by the comparator in response to two registering images is processed, together with the correlation signal from position sensor 57, 58, in the aforedescribed manner by means of a phase detector and a focusing indicator as shown in FIG. 1.

If desired, zone 51 could also have generatrices whose inclination with reference to the shutter axis varies progressively, in a sense opposite that of the generatrices of zone 52, so that the two deflected beams nutate or rock in opposite directions. The zone or zones with variable angle of deflection could also be frustoconical but with an off-axial vertex; in that instance, however, they would not have straight-line generatrices in a plane including the shutter axis and the optical axis 5a.

Since the field of incident light rays is generally narrower behind the diaphragm than forwardly thereof, we prefer to position the shutter or equivalent interceptor upstream of the diaphragm as shown in FIG. 2.

As already pointed out in our parent application Ser. No. 838,377, the rocking or nutation of a deflected beam is not required if the object space in front of the camera is explored by a displacement of the focusing component of the objective throughout its range of adjustment. Thus, the mirror 15 of FIG. 1 could be held stationary in its full-line position, with omission of the associated position sensor 97, 98 and the phase detector 34, so that the coincidence pulse 31 emitted by comparator 22 also acts as an in-focus signal to alert the operator or to arrest the drive motor 43. To simplify the system, mirror 15 may be omitted altogether if the relative position of the two reflecting surfaces 92, 93 is changed so that the intercepted light rays on opposite sides of the optical axis are deflected substantially codirectionally. This has been illustrated in FIG. 3 where, however, the peripheral surface of a rotary shutter 50a has been used in lieu of two stationary semireflectors. Reflecting zones 51a and 52a of shutter 50a are each of frustoconical shape, with a vertex on the shutter axis, coplanar generatrices of these zones thus including with each other an invariable angle which could be 180°, as shown. The intercepted light rays are trained upon mirrors 13 and 95 via ancillary optical devices including lenses 61, 62 and prisms 63, 64. Lenses 61 and 62 may be of an anamorphotic type to compensate for the peripheral dispersion of the reflected rays; such compensation, of course, would not be needed if zones 51a and 52a were replaced by a pair of flat, stationary semireflectors. Prisms 63 and 64 are optical wedges designed to enhance the deviation of the deflected beams from each other for a more precise indication of the correct focusing position. Such wedges could also be used, if desired, with the embodiments of FIGS. 1 and 2 or in systems as disclosed in parent application Ser. No. 830,872 wherein the beams employed in the range finder do not originate within the focusable objective itself.

Figure 3:
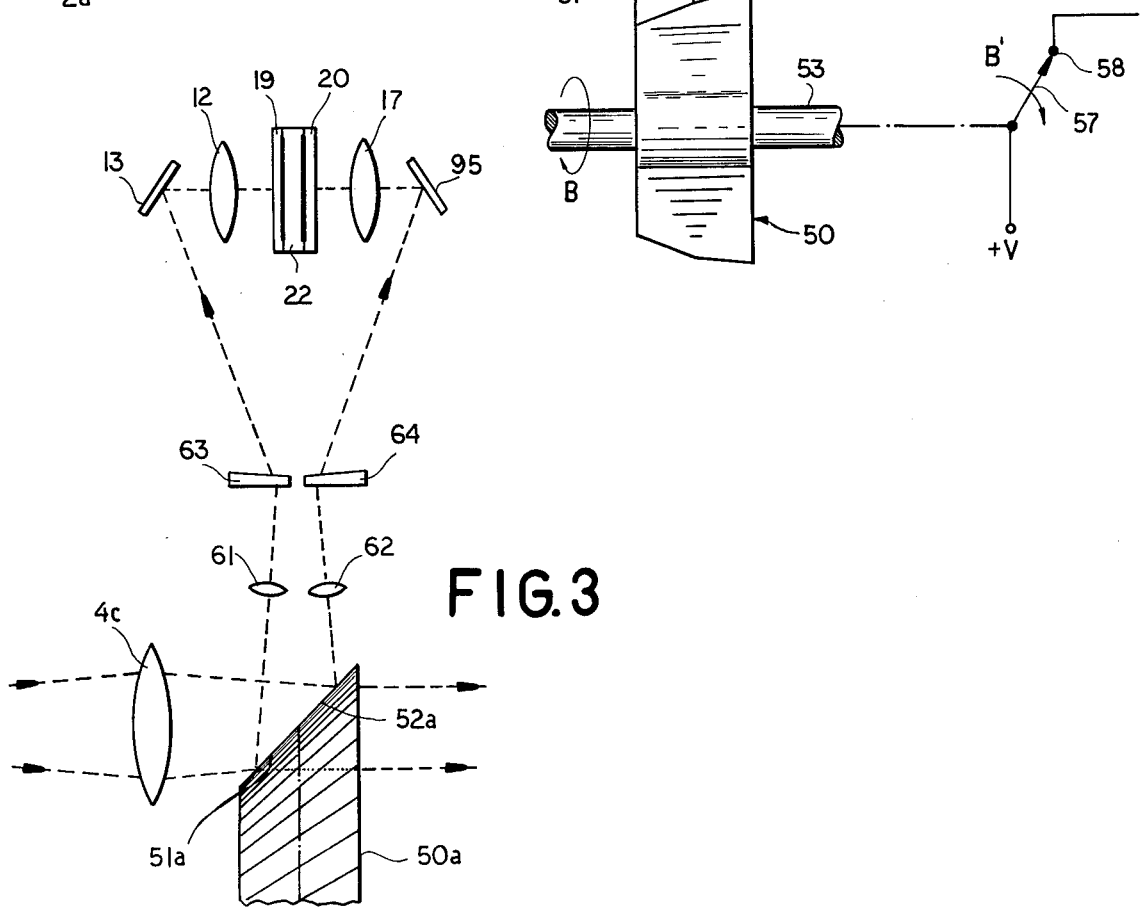

In the system of FIG. 3, comparator 22 operates in the aforedescribed manner to emit a coincidence pulse also acting as an in-focus signal. Here, again, the interception of the incident rays can take place anywhere in the main optical system between the axially shiftable lens member (3, 3a) serving for focusing purposes and the receiving surface of the film or other sensitive medium (e.g. a photocathode of a television camera), provided that the rays originating from a point in a conjugate object plane have a predetermined orientation with reference to the optical axis at their points of interception. Thus, if the objective is of the varifocal or zoom type with components 4a and 4b of FIG. 2 axially displaceable to change the overall focal length, the space between these two components would obviously be unsuitable for the emplacement of reflectors for the purpose described.

Figure 4:
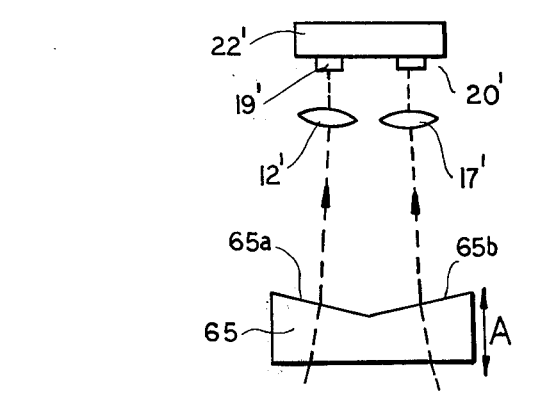
FIGS. 2, 3 and 4 are schematic views similar to part of FIG. 1, showing different embodiments.

FIG. 4 shows two stationary semireflectors 51', 52' disposed in a field of convergent incident rays, here immediately behind front lens 3a, directing their reflected beams through a shiftable prism 65 onto a comparator 22'; the latter differs from comparator 22 of the preceding Figures in that its inputs 19', 20' are juxtaposed on the same side, in line with ancillary lenses 12' and 17'. The prism 65 is axially reciprocable, in a direction bisecting the angle of convergence of the deflected beams, as schematically indicated by an arrow A; such reciprocation can be brought about by a cam or crank drive, for example, with a frequency similar to that of the swingable mirror 15 of FIG. 1. Prism 65 has two inclined faces 65a, 65b, symmetrically inclined to its direction of reciprocation, which reduce the aforementioned angle of convergence to train the deflected beams upon the comparator inputs 19' and 20' in a midposition of its reciprocating stroke when the objective is in focus, i.e. when the object point producing these beams lies in a plane conjugate with the film plane in the position occupied by the focusing lens 3a; a correlation pulse 33 (FIG. 1) emitted in that midposition by the prism drive occurs in this case simultaneously with a correlation pulse 31 from comparator 22' to produce an in-focus signal as described above. When the objective is out of focus, the rays intercepted by semireflectors 51' and 52' (and therefore also the deflected beam) converge at a larger or a smaller angle so that a coincidence pulse will be generated with the prism farther from or closer to comparator 28', respectively, the relative phase of the two pulses being again utilized for the manual or automatic adjustment of lens 3a to the correct focusing position. Lenses 12' and 17' may have different focal lengths to compensate for differences in path length, if necessary.

We claim:

1. In a camera having an objective including an axially shiftable lens member for focusing the objective upon an object within its field of view to project an image of said object upon a receiving surface,
   the combination therewith of:
   setting means operable to displace said shiftable lens member over its range of axial shiftability while holding the objective trained upon an object whereby light rays originating at a common point of said object converge upon said receiving surface in a focusing position of said shiftable lens member;
   a pair of ancillary projection systems including two light reflectors interposed between said shiftable lens member and said receiving surface for intercepting light rays from an object and directing the intercepted light rays over two separate paths away from the objective axis in the form of a first beam and a second beam; and
   photoelectric comparison means illuminable via said projection systems for producing an in-focus signal in response to a coincidence of images produced by said beams, such coincidence occurring whenever said beams are constituted by light rays originating at a common point in an object plane conjugate with said receiving surface.

2. The combination defined in claim 1 wherein said receiving surface is part of an intermittently advancing motion-picture film, said reflectors being adjoining arcuate peripheral portions of a rotary shutter synchronized with the advance of said film.

3. The combination defined in claim 2 wherein said objective further includes two components between which light rays from an axial point on an object plane conjugate with said receiving surface are parallel to said axis, said light reflectors being disposed between said components.

4. The combination defined in claim 1 wherein said light reflectors are two stationary semitransparencies.

5. The combination defined in claim 1, 2 or 4 wherein at least one of said projection systems includes a prism in the path of its beam for deflecting same away from the other beam.

6. In a camera having an objective provided with setting means for varying the position of an axially shiftable lens member thereof to focus the objective upon an object within its field of view for projecting an image of said object upon a receiving surface which is part of an intermittently advancing motion-picture film, the combination therewith of:

a pair of ancillary projection systems comprising light-guiding means disposed in part within said objective between said shiftable lens member and said receiving surface for intercepting incident light rays from an object and directing the intercepted light rays over two separate paths away from the objective axis in the form of a first and a second beam, the light-guiding means of at least one of said projection systems including a reflecting peripheral portion of a rotary shutter mechanically independent of said setting means and synchronized with the advance of said film for varying the relative orientation of incident light rays originating at a common point of said object and traveling over said paths;

photoelectric comparison means illuminable by the light rays traveling over said paths for emitting a coincidence signal whenever two images respectively produced by said beams register with each other to indicate that said projection systems are trained upon the same object;

drive means coupled with said shutter for displacing same in a succession of rotary sweeps whereby said coincidence signal appears in the form of a short first pulse during each sweep;

sensing means operatively coupled with said drive means for generating a correlation signal in the form of a short second pulse during each sweep in a predetermined reference position of said shutter in which incident light rays from a point in an object plane conjugate with said receiving surface product registering images on said comparison means; and phase-detecting means connected to said comparison means and to said sensing means for determining the relative time position of said first and second pulses.

7. The combination defined in claim 1 wherein said peripheral portion is divided into two adjoining ring segments whose relative inclination in a plane including the shutter axis varies progressively over the periphery of said shutter.

8. The combination defined in claim 1 or 3, further comprising a diaphragm in line with said objective, said shutter being disposed between said shiftable lens member and said diaphragm.

9. In a camera having an objective provided with setting means for varying the position of an axially shiftable lens member thereof to focus the objective upon an object within its field of view for projecting an image of said object upon a receiving surface, the combination therewith of:

a pair of ancillary projection systems comprising light-guiding means disposed in part within said objective between said shiftable lens member and said receiving surface for intercepting incident light rays from an object and directing the intercepted light rays over two separate paths away from the objective axis in the form of a first and a second beam, the light-guiding means of at least one of said projection systems including a prism with a pair of relatively inclined faces respectively interposed in the paths of said first and second beams, said prism being mechanically independent of said setting means and movable in a direction bisecting the angle included by said faces for varying the relative orientation of incident light rays originating at a common point of said object and traveling over said paths;

photoelectric comparison means illuminable by the light rays traveling over said paths for emitting a coincidence signal whenever two images respectively produced by said beams register with each other to indicate that said projection systems are trained upon the same object;

drive means coupled with said movable prism for displacing same in a succession of sweeps whereby said coincidence signal appears in the form of a short first pulse during each sweep;

sensing means operatively coupled with said drive means for generating a correlation signal in the form of a short second pulse during each sweep in a predetermined reference position of said movable prism in which incident light rays from a point in an object plane conjugate with said receiving surface produce registering images on said comparison means; and phase-detecting means connected to said comparison means and to said sensing means for determining the relative time position of said first and second pulses.

10. The combination defined in claim 1, 9, 2 or 4 wherein at least one of said projection systems includes optical means for compensating the effect of path-length differences upon the images produced by said beams.

* * * * *